Dec. 2, 1947.  N. PLANK  2,432,039
DEVICE FOR MEASURING THE DENSITY OF FLUIDS IN PIPES
Filed Feb. 25, 1946
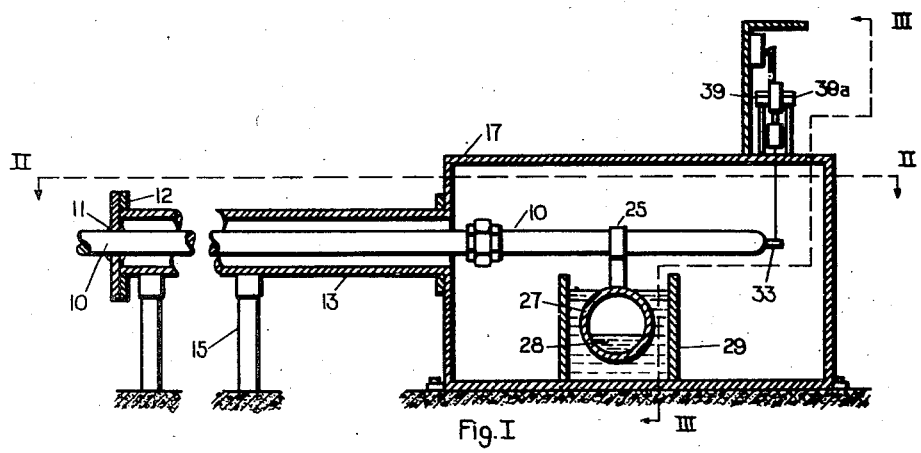
Fig. I
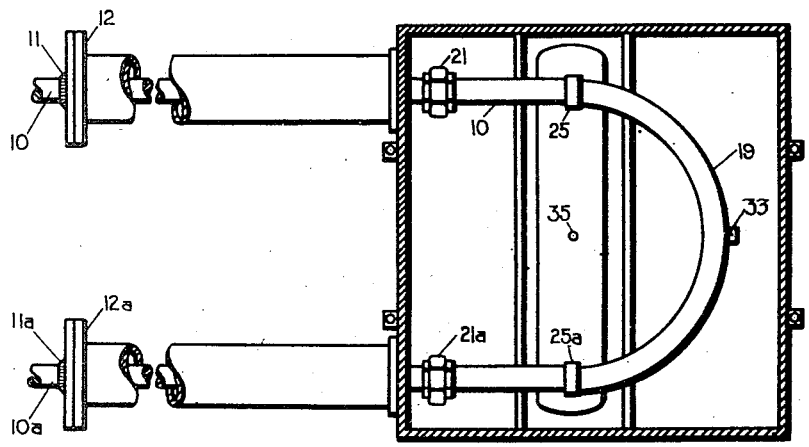
Fig. II
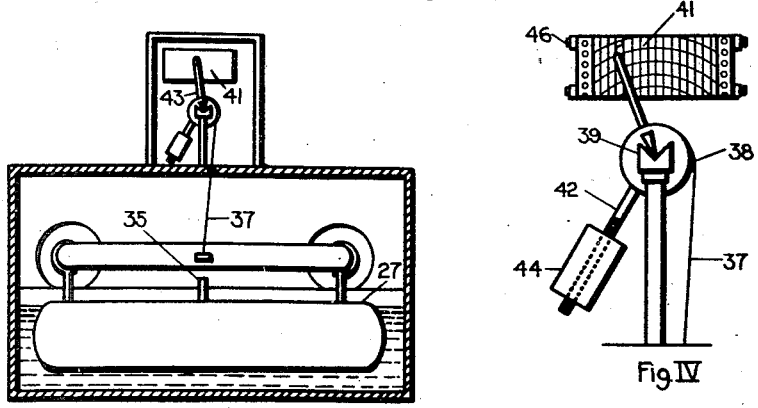
Fig. III
Fig. IV
Inventor: Norris Plank
By his Attorney:

Patented Dec. 2, 1947

2,432,039

UNITED STATES PATENT OFFICE 2,432,039

DEVICE FOR MEASURING THE DENSITY OF FLUIDS IN PIPES

Norris Plank, East Chicago, Ind., assignor to Shell Development Company, San Francisco, Calif., a corporation of Delaware Application February 25, 1946, Serial No. 649,907

4 Claims. (Cl. 73—32)

This invention pertains to the art of measuring the weight, density or specific gravity of liquids flowing in tubular conduits or pipe lines.

The determination of the specific gravity of liquids flowing in such conduits is of great importance in many operations. Thus, in dispatching or controlling the flow of liquid products through pipe lines, a change in the specific gravity of the fluid serves to indicate that a shipment or tender of a given fluid has passed a particular point in the pipe line, and has been replaced by the following tender. A change of specific gravity may further serve as an indication of the contamination of a product by another, or of the admixture of a gas to a liquid, whereby, through a proper calibration of the measuring apparatus, the composition or the degree of contamination of such fluids may be accurately determined. The above considerations apply not only to long pipe lines but also to shorter pipe line connections used in refineries or other industrial installations. In petroleum production work, an accurate knowledge of the specific gravity, and thus of the composition, of the petroleum fluids produced or of the drilling fluids used in drilling a well is obviously necessary for a proper control of the operations.

It is therefore an object of this invention to provide a system whereby the weight or specific gravity of a pipe line fluid may be continuously and automatically measured or recorded.

It is also an object of this invention to provide for this purpose a system of improved sensitivity and accuracy.

It is also an object of this invention to provide a simple and rugged system which may be readily installed in any pipe line to measure the specific gravity of the liquid flowing therein instantaneously or without appreciable time lag.

It is also an object of this invention to provide for this purpose a device comprising a sample chamber section of smooth symmetrically arranged pipe, through which such fluid as oil, drilling mud, etc. may flow in a turbulent state, and through which a regular pipe line scraper may be run to remove any solid sediment capable of adversely affecting the accuracy of the device, said sample chamber being free of any enlarged section in which sediment would tend to accumulate, and from which it would be difficult or impossible to remove.

It is also the object of this invention to provide for this purpose a system to measure instantaneously and accurately the specific gravity of the liquid flowing therein at actual pipe line conditions, said system being operative at, and not susceptible to damage by, conditions involving high or low pressures, temperatures and velocity rates of the fluid passing therethrough.

These and other objects of this invention will be understood from the following description taken with reference to the attached drawings, wherein Fig. 1 is a diagrammatical side elevation view, partly in cross-section, of the present installation.

Fig. 2 is a plan view taken along line 2—2 of Fig. 1.

Fig. 3 is an end elevation view taken along line 3—3 of Fig. 1.

Fig. 4 is side elevation of the differential weighing element (enlarged).

Referring to the drawing, 10 is a pipe line forming part of a system which may be used for the transportation of petroleum or any other fluid, in oil fields, refineries or other industrial installations. The pipe 10 may be an integral part of the main line itself, or a by-pass line, controlled by regular valves, and having the same or a reduced diameter, such for example as 2 inches. The pipe 10 should be as flexible as possible, and should therefore not be made heavier than required by the pressures to be used. A portion of the line 10 may be incased, for protection and rigidity purposes, in a larger diameter pipe 13, resting on supports 15 and a housing or chamber 17, wherein it is curved to form a semi-circular or U-shaped bend 19. The line 10 is rigidly attached to casing 13 by welding at 11 and 11a to the flanged heads 12 and 12a. The curved end 19 of the line is free to swing in the vertical plane, thus forming a cantilever beam anchored or supported at points 11 and 11a.

Attached to symmetrical points of the line 10 or bend 19 are saddle or brace elements 25 and 25a rigidly connected to a float 27, which is submerged in the liquid held in a reservoir or trough 29, positioned within the chamber 17. The float 27 is provided with means 35, such as a tubular outlet, whereby its buoyancy may be accurately controlled and adjusted by putting in or taking out liquid ballast 28 in float chamber 27. Attached to the center or apex point of the bend 19 is an arm or bracket element 33, connected by link means such as a metal ribbon, chain, wire or string 31 to a sprocket, pulley or pulley segment 38, supported on pivot bearings 39 and 39a and provided with a counterbalance or pendulum arm 42.

A pointer or pen arm 43 has one end attached to pulley segment 38 while its other end is free to swing through a suitable arc to indicate and/or record its movement on a chart 41, which may be of any desired calibrated disc or strip type, and may be actuated by a suitable clock mechanism to unwind on rollers 46, as shown in Fig. 4.

In operation the buoyancy of the float 27 is adjusted by adding or removing the liquid ballast 28 through tubular opening 35 to counterbalance the moment due to the weight of the free section of pipe 10 and its contents, present or flowing therein, in such a manner that both legs of pipe 10 will be maintained in a position near the true horizontal plane and pointer 43, actuated by link 37 and pulley segment 38, will point to a figure on chart 41 which represents the specific gravity of the liquid present or flowing in pipe 10, the specific gravity of which liquid has been determined by weighing a sample of said liquid on a standard laboratory balance.

With light weight liquid present or flowing in pipe 10 and pointer 43 pointing to the proper line or figure on chart 41, the pendulum arm 42, with pendulum weight 44 attached, is arranged to hang in a vertical or near vertical position below pivot bearing 39. When heavy liquid is introduced in pipe 10, the pipe is deflected downward due to the heavier liquid in pipe 10 causing the curved end 19 to travel downward, which in turn causes float 28, through bracket elements 25 and 25a, to sink to a lower level in liquid contained by reservoir or trough 29. The motion of the curved end 19 of pipe 10 is transmitted through link 37, pulley segment 38 and pivot bearing 39, to pendulum arm 42, with pendulum weight 44 attached, causing pendulum arm 42 to swing away from vertical toward a horizontal position. The size of weight 44 and its position on pendulum arm 42 is adjusted to effectively weigh the difference in specific gravity of the contents of pipe 10 when filled with light liquid or with heavy liquid.

The operational features of the present apparatus may be illustrated by the following example. The internal capacity of a sample chamber consisting for example of a 2 inch pipe 10 (from the point of support 11), pipe 19 and pipe 10a (to the point of support 11a) is approximately eight gallons. Assuming for simplicity that the rigid supports 11 and 11a support one-half of the weight of said chamber and its contents, the free half of the U-bend chamber, supported by the float, will contain four gallons of liquid, the density variations of which are to be measured by the present device. The sample chamber is first filled with a liquid of the known lightest weight to be handled by the system, and the buoyancy of the float is adjusted to support the U-bend in a substantially horizontal position with its contents of light weight fluid. The pendulum arm 42 under these conditions should be near the vertical position and the pen arm 43 pointing to the proper place or line on the low gravity side of the chart. The sample chamber is thereupon filled with a liquid of known high density to be handled by the system. The size of the pendulum weight and its position on the pendulum arm may be adjusted to balance the additional weight of the heavier fluid until the pen arm is made to point to the proper place on the high gravity side of the chart.

Thus, the buoyancy of the float supports the weight of the pipe and of the lighter fluid, while the pendulum weight balances the difference of weight between the lighter and the heavier fluids.

For various types of service, weights of various sizes may be provided. The selection of these weights and their correct adjustment along the arm 42 for any desired range to be measured can be readily effected by preliminary calibration in the manner outlined above.

The sensitivity of the present apparatus depends on range of specific gravity of the liquids to be handled. For the 2 inch apparatus used as illustration, it has been found that when the apparatus is adjusted for liquids of closely similar specific gravities, significant values may be obtained from the chart record representing the specific gravity to the fourth decimal place. When the apparatus is adjusted to a wide range of gravity, its sensitivity is slightly below the fourth decimal place. The table hereinbelow gives the results of sensitivity measurements made on this 2 inch device when adjusted for the following ranges: (1) gasolines of approximately equal gravity (2) gasolines, kerosenes and light fuel oils (3) various fluids ranging from butane to heavy fuel oil. The sensitivity was tested by noting the magnitude of the smallest weight capable of causing a readable fluctuation on the chart record when the weight is placed on the pipe U-bend.

| Range Adjustment | Volume, Milliliters | Specific Gravity of Fluid | Weight of Fluid, Grams | Weight Difference, Grams | Sensitivity of Device, Grams |
|---|---|---|---|---|---|
| (1) | 15.140 | .73 to .72 | 11,052 to 10,901 | 151 | 1.5 |
| (2) | 15.140 | .85 to .65 | 12,869 to 9,841 | 3,028 | 2.5 |
| (3) | 15.140 | .90 to .55 | 13,626 to 8,327 | 5,299 | 5.0 |

While the weighing device balances the major part of the weight difference between the fluids measured, the stress in the metal walls of the pipe also opposes the bending moment and thus modifies to a certain degree the effect of the added load on the weighing device. This action is however reduced to a negligible value by the length of the U-bend pipe used. The displacement of the liquid in the trough by the tubular float outlet 35 and the brace elements 25 and 25a also takes some of the load away from the weighing device. This displacement is however of negligible value compared to the total load and may be kept at a minimum by giving the elements 25, 25a and 35 the smallest cross-section compatible with strength and rigidity. Thus, neither the internal stress set in the cantilever beam formed by the pipe nor the displacement of the float liquid by the float attachments conflict with the proper operation of the weighing device; on the contrary, with the system properly calibrated, these effects supplement each other to give a correct indication in response to changes of fluid gravity.

Since temperature variation of the liquid in the trough may cause an error in the operation of the apparatus, the trough should preferably be located in an atmosphere of controlled temperature or means may be provided to compensate for the error caused by variations of temperature. For example, if the apparatus is set near ground level, the trough and float may be set below the ground so as to be maintained at substantially constant earth temperature. If the apparatus is set in the field on a pipe line, the trough may be buried underground in which case the trough temperature as well as the temperature of the liquid flowing in the pipe line are at earth temperature which is sufficiently constant for accurate operation.

Although it has already been proposed to measure the specific gravity of a fluid flowing in a pipe line by determining the deflection of the center point of a length of straight pipe, it will be appreciated that the sensitivity of the present system is achieved by providing a sufficient length of a smooth pipe having a U-bend which requires, for operation, a movement of the free end up and down through only a very few degrees above or below the true horizontal, and eliminates the necessity of using flexible connections, which flexible connections are objectionable as tending to distort under fluctuating pressure conditions and develop leaks or rupture under high pressure conditions affecting the accuracy of the measurements and the durability of the device.

It is understood that by suitable calibration the system will indicate accurately the specific gravity of any type of fluid that will flow in a pipe line while conditions of pressure, temperature and velocity rate of the flowing fluid are extremely high, low or fluctuating. It is also understood that not only the specific gravity but also other characteristics of a particular pipe line fluid, such for example as the amount of gas dissolved in a liquid phase, or of solids suspended therein, may likewise be accurately determined by the means of the present system.

I claim as my invention:

1. Apparatus for measuring the specific gravity of a fluid filling a pipe line system comprising a pipe forming part of said system, said pipe having a curve formed therein in a horizontal plane, support means for rigidly anchoring said pipe at points located symmetrically with regard to said curve, float means for yieldably supporting the curved portion of said pipe to balance out the moment about said rigid supports due to the weight of said pipe and of the fluid therein, counterbalance means linked to said curved portion of the pipe substantially at its apex to oppose deflections of said pipe portion in a vertical plane due to variations of the specific gravity of the fluid in said pipe, and indicating means actuated by said counterbalance means for indicating the magnitude of said deflections.

2. Apparatus for measuring the specific gravity of a fluid flowing in a pipe line system, comprising a pipe forming a part of said system, said pipe having a portion curved in a horizontal plane, said curved portion forming a U-shaped beam with straight parallel legs, means for rigidly supporting the foot ends of said straight legs, means for balancing out the moment of said curved end of the U-shaped beam, said balancing means comprising a reservoir adapted to be filled with a liquid, a float adapted to be submerged in said liquid, brace means connecting said float to said curved portion of the pipe, a weighing device, and link means connecting said weighing device to a point of the curved portion of the pipe located centrally of said supports, whereby said device is caused to indicate the deflections of said pipe occurring in a vertical plane under the effect of changes of the specific gravity of the fluid flowing in the pipe.

3. Apparatus for measuring the specific gravity of a fluid filling a pipe line system, comprising a pipe forming a part of said system, said pipe having a portion curved in a horizontal plane, support means located symmetrically of said curved portion for rigidly suspending the curved portion as a cantilever beam, means for balancing out the moment of said cantilever beam about said support means, said balancing means comprising a reservoir adapted to be filled with a liquid, a hollow float adapted to be submerged in said liquid, means for adjusting the buoyancy of said float by varying the quantity of liquid ballast contained inside the float, brace means connecting said float to said curved portion of the pipe, a weighing device, and link means connecting said weighing device to a point of the curved portion of the pipe located centrally of said supports, whereby said device is caused to indicate the deflections of said pipe occurring in a vertical plane under the effect of changes of the specific gravity of the fluid flowing in the pipe.

4. Apparatus for measuring the specific gravity of a fluid filling a pipe line system, comprising a pipe forming a part of said system, said pipe having a portion curved in a horizontal plane, support means located symmetrically of said curved portion for rigidly suspending the curved portion as a cantilever beam, means for balancing out the moment of said cantilever beam about said support means, said balancing means comprising a reservoir adapted to be filled with a liquid, a hollow float adapted to be submerged in said liquid, means for adjusting the buoyancy of said float by varying the quantity of liquid ballast contained inside the float, brace means connecting said float to said curved portion of the pipe, a weighing device comprising pulley means, a counterbalancing pendulum arm rigidly attached thereto, a pointer arm rigidly attached thereto, and link means connecting said pulley means to a point on said curved portion of the pipe substantially at the apex thereof, whereby deflections of said pipe occurring in a vertical plane under the effect of changes of specific gravity of the fluid filling said pipe are indicated by displacements of said pointer arm.

NORRIS PLANK.

REFERENCES CITED

The following references are of record in the file of this patent:

UNITED STATES PATENTS

| Number | Name | Date |
|---|---|---|
| 1,511,604 | Ganucheau | Oct. 14, 1924 |
| 2,311,312 | Marsh | Feb. 16, 1943 |
| 2,321,175 | Binckley | June 8, 1943 |

FOREIGN PATENTS

| Number | Country | Date |
|---|---|---|
| 5,722 | Great Britain | 1828 |